UNITED STATES PATENT OFFICE.

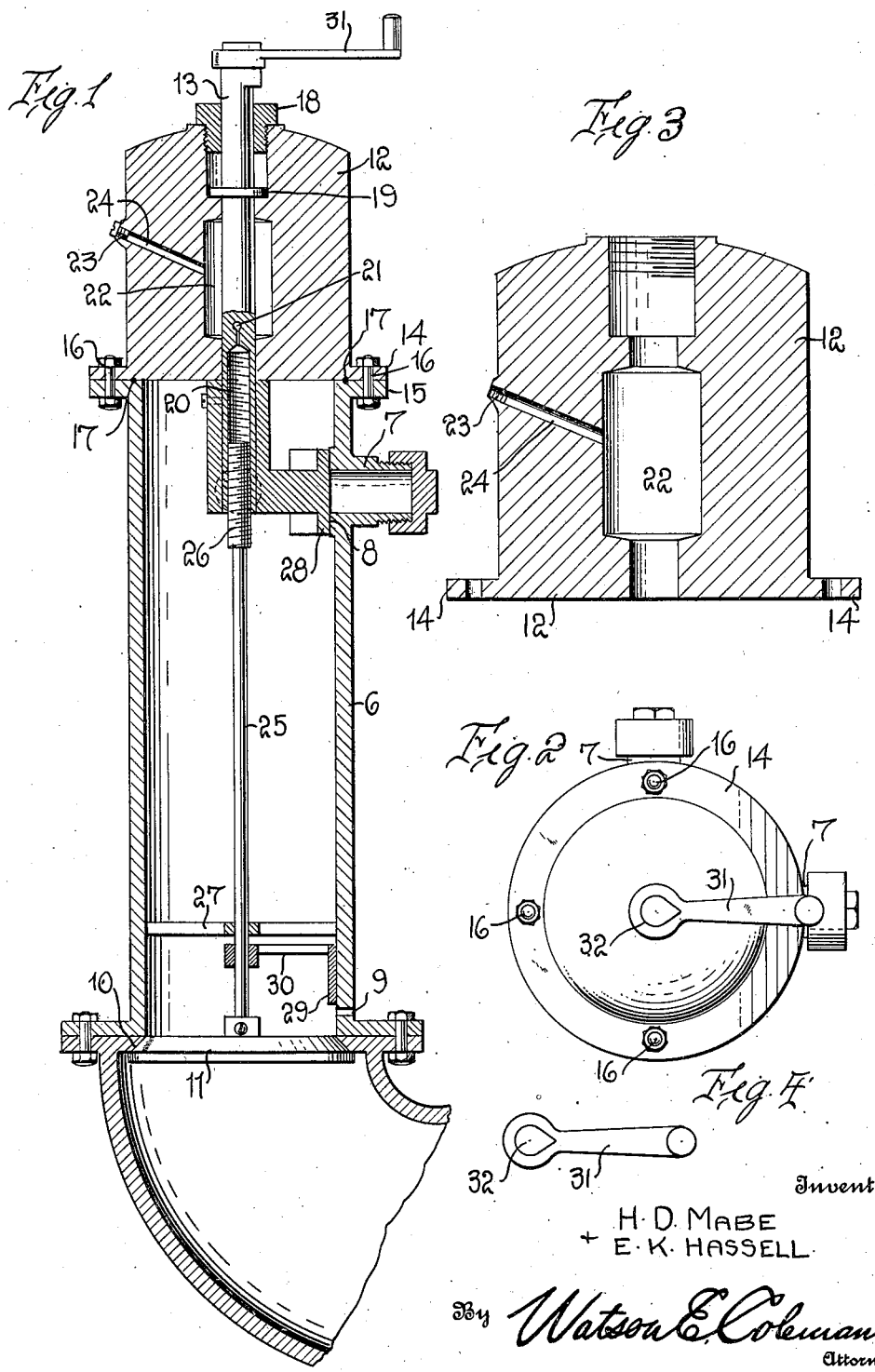

HENDERSON D. MABE AND EDWARD K. HASSELL, OF KINSTON, NORTH CAROLINA.

HYDRANT.

1,200,961.

Specification of Letters Patent.  Patented Oct. 10, 1916.

Application filed June 24, 1916. Serial No. 105,742.

*To all whom it may concern:*

Be it known that we, HENDERSON D. MABE and EDWARD K. HASSELL, citizens of the United States, residing at Kinston, in the county of Lenoir and State of North Carolina, have invented certain new and useful Improvements in Hydrants, of which the following is a specification, reference being had to the accompanying drawings.

This invention is a hydrant.

One object of the invention is to provide a hydrant to which may be connected as many lines of hose as there are outlets.

Another object is to provide a hydrant to which may be connected a second line of hose without stopping the flow of water through a first line of hose connected thereto.

A further object is to provide a hydrant having a separate valve rotatable on the spindle, the valve being adapted to engage with a hose outlet.

Broadly stated, the invention comprises a hydrant including a rotatable spindle provided with screw threads, a main valve stem provided with threads to engage with the threads on the spindle, said stem also carrying a valve, a hose outlet valve to engage with the outlet, a valve for a drain outlet, and means to rotate said spindle and move said valves.

One practical method of constructing the hydrant will be described and illustrated in the accompanying drawings, in which, Figure 1 is a sectional view of a hydrant; Fig. 2 is a top plan view; Fig. 3 is an enlarged vertical sectional view of the upper portion of the hydrant; Fig. 4 is a top plan view of a wrench.

The hydrant comprises a casing 6 which may be of any suitable size and of any convenient material, though preferably it may be made of cast iron. This casing may be provided with a plurality of discharge outlets or openings 7. The outlets 7 are adapted to be connected with a hose, not shown. The inner end of each of outlet openings 7 may be provided with a suitable seat 8 surrounding and adjacent the opening.

The casing 6 is provided near its lower end with the drain opening 9 which is adapted to permit the water trapped within the casing to escape and thereby prevent freezing of the hydrant. The lower end of the casing 6 may be formed as a valve seat 10, as shown more particularly in Fig. 1 and to coöperate with this seat 10, is a valve 11.

This valve 11 controls the main supply of water to the hydrant. The valve seat 10 may be formed of suitable material so that when the valve 10 is brought into seating engagement, no water will be permitted to leak past.

The casing 6 may be provided with a suitable top 12 which is provided with an aperture through which passes a spindle 13. This top or cap 12 may be secured to the casing 6 by means of the flanges 14 and 15 shown upon both the top 12 and the casing 6 and the bolts 16. Suitable packing 17 may be inserted between the opposing flanges to prevent leakage. The aperture formed in the top of the cap 12 may be closed by means of a stuffing box having the stuffing box nut 18, as shown. The spindle 13 is provided within the top 12 and the stuffing box with a collar 19. The upper end of this spindle 13 is sector-shaped to engage with a wrench. The lower end of this spindle 13 is provided with a hole having suitable threads 20 formed therein. Adjacent the threads 20 formed in the spindle 13, is an oil hole 21 so positioned that it will communicate from the outside with the threads.

Surrounding the spindle 13 is an oil reservoir 22 which communicates with the outside by means of an oil hole 23 and a small pipe 24, oil being injected into the oil hole 23 passes into the pipe 24 and thence into the reservoir 22. As this reservoir surrounds the spindle 13, the oil hole 21 formed in the stem will receive oil from the reservoir 22 and the threads 20 will be lubricated. To coöperate with the spindle 13, there is a valve stem 25 which is provided at one end with suitable threads 26 to coöperate with the threads 20 formed in the spindle 13. The lower end of this stem 25 carries the valve 11. Positioned at some convenient point above the lower end of the casing 6, is a bracket 27, which is provided with an aperture through which passes the stem 25. Thus the stem is guided and the valve 11 is brought into proper engagement with the seat 10. This bracket also serves to position the valve stem 25 centrally of the casing 6.

Adjacent the upper end of the valve stem 25, there is positioned a valve 28 which is adapted to coöperate with the outlets 7. This valve at its outer face is arcuate to conform to the shape of the seat 8 and may be secured to the spindle 13 in any convenient or customary way. Secured to the valve stem 25 between the valve 11 and the bracket 27 is another valve 29 carried at the end of the arm 30 which is secured to the valve stem 25. This valve 29 is so positioned that it will coöperate and engage to open and close the water drain outlet 9.

To coöperate with the upper end of the spindle 13 to rotate the same, a handle 31 is provided which has a sector-shaped opening 32 formed in one end. This sector-shaped opening is adapted to engage with the end similarly formed upon the stem 15. The apex of the sector is so positioned that it points in the direction in which the valve 28 passes, so that the operator may readily determine just the position of the hose outlet valve. This shape also is adapted to impart a positive location to the spindle 13 and to the valve stem 25.

In practical operation, the hydrant is usually provided with caps over the hose outlets and when one of these is removed and a hose attached thereto, the handle 31 is positioned upon the spindle 13 which spindle may be rotated by means of the handle and through the threaded portions 20 and 26, the main valve 11 is opened and the water drain outlet is closed. Water is thus admitted within the casing 6 and flows outward through the hose or discharge opening. If it is desired to attach a second line of hose, as the case may be, when the first line is being used to throw water upon the fire, the valve 28 is turned so that it covers the opening to which it is desired to attach the second line of hose. The cap from this outlet is removed and the hose attached, when the valve 28 is moved away. Thus both hose outlets communicate directly with the interior of the casing 6 and no interruption to the first stream flowing from the hose outlet 7 has been made.

As illustrated in Fig. 1 it is to be noted that the seat 8 extends inwardly of the casing 6 so that when the valve 28 is in a neutral position, it is free of contact with the casing. This is of particular advantage as there is sufficient clearance between the valve 28, when in this position, and the casing 6, to prevent the same from adhering to the casing 6 or otherwise held against movement.

Minor changes in the form and details of construction may be resorted to without departing from the spirit of our invention, or the scope of the appended claims.

Having thus described this invention, what is claimed is:—

1. A hydrant provided with two longitudinally spaced discharge openings, a spindle extending within the hydrant and disposed longitudinally thereof, the inner ends of the spindle being provided with a threaded bore, a valve fixed to the spindle and coacting with one of the openings, a stem arranged within the hydrant and having one extremity threaded within the bore of the spindle whereby rotation of the spindle imparts endwise movement to the stem, and a valve fixed to the stem and coacting with the second opening of the hydrant.

2. A hydrant comprising a casing including discharge openings, a rotatable valve to coöperate with the openings mounted on a valve spindle, a stem coöperatively connected to the spindle, a valve carried by the stem, and means to rotate the spindle.

3. A hydrant comprising a casing provided with discharge outlets, a valve to coöperate with the outlets mounted on a spindle, a threaded stem to coöperate with the spindle, said stem carrying a valve at one end, a drain outlet, a movable valve for the drain outlet, and means to move the spindle, stem and the several valves.

In testimony whereof we hereunto affix our signatures in the presence of two witnesses.

HENDERSON D. MABE.
EDWARD K. HASSELL.

Witnesses:
PAUL T. JOHNSON,
LONNIE BUCK.